Patented Sept. 6, 1927.

1,641,446

UNITED STATES PATENT OFFICE.

FRANCIS P. McCOLL, OF RIDGEWOOD, NEW JERSEY, ASSIGNOR TO COMPACT COFFEE CORPORATION, A CORPORATION OF DELAWARE.

COFFEE TABLET AND PROCESS OF MAKING SAME.

No Drawing. Application filed September 2, 1926. Serial No. 133,303.

This invention pertains to improvements in cakes composed of coffee and processes of making such cakes. Its object is to provide coffee units, in the form of small, compact cakes, which are composed entirely of coffee.

The ingredients used in forming my coffee units are roast coffee (either ground, powdered or in bean form) and coffee concentrate in liquid, ground or powdered form. The proportion of twenty parts coffee to one part coffee concentrate has been found to give satisfactory results but the ratio will, of course, vary as different grades of coffee and coffee concentrates of different degrees of density are used.

In practicing my present invention I take a measured quantity of coffee, mix it thoroughly with a smaller measured quantity of coffee concentrate which has been separately prepared from another body of coffee, and mould the resultant product into cakes of uniform size. I have found that coffee concentrate, in either ground, powdered or liquid form, constitutes an ideal binder for use in forming coffee into cakes. I have also found that the employment of high pressures for the formation of such cakes is unnecessary and that such cakes may be moulded into form by the employment of a pressure of approximately one hundred pounds per square inch.

I am aware of the fact that heretofore plans have been suggested for the manufacture of cakes or tablets composed in part of coffee and in part of various agglutinant substances employed for the purpose of binding the coffee into more or less compact cakes. I am also familiar with United States Patents Nos. 1,210,542 and 1,535,233 setting forth proposed methods of forming coffee into cakes or tablets by utilizing to a greater or less extent certain agglutinant elements of the coffee forming the body of the cakes in process of manufacture. My present invention is, however, clearly distinguished from those above indicated by the fact that my coffee units contain no ingredients whatever except coffee, the binder itself being coffee in concentrated form; moreover, this binder is not extracted from the coffee forming the body of the cakes but is prepared from a separate lot of coffee, the effect of mixing the concentrate with the coffee forming the body of the cake being to enrich the coffee flavor of the unit and bind the cake into a compact mass. But the unit is all coffee—no substance whatever other than coffee being utilized as an ingredient.

I do not undertake to explain the chemical action which takes place between the coffee and the coffee concentrate when the two are mixed together and pressed into cakes, but it is apparent that the coffee concentrate, when mixed with the coffee, fills in the spaces between the grains of coffee and, upon the application of the pressure necessary to form the cakes, the particles of the two lots of material impregnate one another in such manner as to form cakes of sufficient density and strength to serve the purposes of my invention.

The advantages of forming coffee into compact units are obvious. Each tablet preferably contains sufficient material to make but a single cup of coffee. Commercial packages of coffee units may be marked so as to indicate the number of cakes contained therein, thus informing the purchaser as to the exact number of cups of coffee which may be prepared therefrom. The cake may contain either a single grade of coffee, or different grades in any desired proportion may be blended in the same cake. In forming such coffee units numbers or other symbols may be stamped into the face of each cake to indicate the exact grade of coffee or blend of coffees contained therein, thus insuring the user against misrepresentation or fraud.

While my invention is herein described as relating particularly to the formation of cakes composed of coffee and coffee concentrate, the invention is also applicable to various other food products which may be advantageously formed into cakes; the essence of my invention consisting in the mixing of a measured quantity of the concentrate prepared from one body of a given commodity with another measured quantity of said commodity and the pressing of the resultant product into cakes, the concentrate acting as a binder.

"Coffee concentrate" is a term commonly applied in the art to a water soluble extract of coffee, and the term is to be so understood wherever it appears in this application.

What I claim is:—

1. The herein described process of forming coffee units, consisting in mixing a measured quantity of roasted disintegrated coffee bean with a measured quantity of coffee concentrate and moulding the resultant product into cakes under pressure.

2. A coffee unit consisting of a measured quantity of roasted disintegrated coffee bean and a measured quantity of coffee concentrate intermixed, and moulded under pressure, in which the coffee concentrate acts as the binding agent.

3. A coffee unit consisting of roasted disintegrated coffee bean impregnated, enriched and held together by a coffee concentrate.

In testimony whereof I have affixed my signature.

FRANCIS P. McCOLL.